US006788702B1

(12) United States Patent
Garcia-Luna-Aceves et al.

(10) Patent No.: US 6,788,702 B1
(45) Date of Patent: Sep. 7, 2004

(54) PROTOCOL FOR NEIGHBORHOOD-ESTABLISHED TRANSMISSION SCHEDULING

(75) Inventors: J. Joaquin Garcia-Luna-Aceves, San Mateo, CA (US); David A. Beyer, Los Altos, CA (US); Chane L. Fullmer, Santa Cruz, CA (US)

(73) Assignee: Nokia Wireless Routers, Inc., Mountain View, CA (US)

( * ) Notice: Subject to any disclaimer, the term of this patent is extended or adjusted under 35 U.S.C. 154(b) by 0 days.

(21) Appl. No.: 09/418,899

(22) Filed: Oct. 15, 1999

(51) Int. Cl.$^7$ ............................................... H04L 12/43

(52) U.S. Cl. ...................... 370/458; 370/431; 370/337

(58) Field of Search ................................ 370/458, 412, 370/468, 447, 238, 329, 337, 341, 348, 349, 431, 442, 443, 444; 455/502, 517

(56) References Cited

U.S. PATENT DOCUMENTS

| 4,661,902 A | 4/1987 | Hochsprung et al. |
| 4,677,617 A | 6/1987 | O'Conner et al. |
| 5,130,987 A | 7/1992 | Flammer |
| 5,142,533 A | 8/1992 | Crisler et al. |
| 5,231,634 A | 7/1993 | Giles et al. |
| 5,319,641 A | 6/1994 | Fridrich et al. |
| 5,502,724 A | 3/1996 | Chen et al. |
| 5,519,717 A | 5/1996 | Lorenzo et al. |
| 5,530,918 A | * 6/1996 | Jasinski ...................... 340/7.25 |

(List continued on next page.)

FOREIGN PATENT DOCUMENTS

| WO | WO 98/09469 A1 | 3/1998 |
| WO | WO 99/46899 | 9/1999 |
| WO | WO 00/48367 A3 | 8/2000 |

OTHER PUBLICATIONS

International Search Report; PCT/US/41179; Nokia Wireless Routers, Inc. et al.; Jan. 16, 2002; (7 pages).
W. Ramanathan and Errol L. Lloyd, "Scheduling Algorithms For Multi–hop Radio Networks", ACM Transactions, pp. 211–222 (Aug. 1992).
C. David Young, "USAP: A Unifying Dynamic Distributed Multichannel TDMA Slot Assignment Protocol," Rockwell International Communication Systems Division, pp. 1–5 (Oct. 1996).

(List continued on next page.)

Primary Examiner—Wellington Chin
Assistant Examiner—Jamal A. Fox
(74) Attorney, Agent, or Firm—Squire, Sanders & Dempsey L.L.P.

(57) ABSTRACT

Scheduling packets are exchanged among neighboring nodes of a computer network. These scheduling packets include descriptions of a transmitting node's 2-hop neighborhood within the computer network, and nodes are able to determine transmission schedules from information received via said scheduling packets. Preferably, the computer network is a synchronized network in which time is dived into a number of frames, each of which are made up of a plurality of slots. In such cases, the exchange of scheduling packets should occur within a first number of the slots of each frame, preferably in a common communication channel. Transmission schedules may be determined, at least in part, because nodes advertise their availability using the scheduling packets. The above-mentioned descriptions may include an identification of received communication times and/or channels, an identification of requested communication times and/or channels and an identification of available communication times and/or channels. The requested communication times and/or channels should correspond to available times and/or channels advertised by one or more nodes of the computer network. In this scheme, the identification of reserved communication times and/or channels should be made after eliminating any conflicting scheduled transmissions for those communication times and/or channels.

88 Claims, 4 Drawing Sheets

U.S. PATENT DOCUMENTS

| | | | |
|---|---|---|---|
| 5,638,371 A | | 6/1997 | Raychaudhuri et al. |
| 5,652,751 A | | 7/1997 | Sharony |
| 5,682,382 A | | 10/1997 | Shepard |
| 5,687,015 A | | 11/1997 | Abe |
| 5,719,868 A | * | 2/1998 | Young ........................ 370/436 |
| 5,721,725 A | | 2/1998 | Want et al. |
| 5,771,462 A | | 6/1998 | Olsen |
| 5,968,133 A | | 10/1999 | Latham et al. |
| 6,026,303 A | | 2/2000 | Minamisawa |
| 6,069,885 A | * | 5/2000 | Fong et al. ................. 370/336 |
| 6,141,336 A | * | 10/2000 | Bauchot et al. ............. 370/348 |
| 6,178,323 B1 | | 1/2001 | Nagata |
| 6,229,810 B1 | | 5/2001 | Gerszberg et al. |
| 6,310,886 B1 | * | 10/2001 | Barton ........................ 370/462 |
| 6,317,436 B1 | * | 11/2001 | Young et al. ............... 370/443 |
| 6,331,973 B1 | * | 12/2001 | Young et al. ............... 370/337 |
| 6,487,186 B1 | * | 11/2002 | Young et al. ............... 370/336 |
| 6,504,829 B1 | * | 1/2003 | Young et al. ............... 370/337 |
| 6,574,199 B1 | * | 6/2003 | Young et al. ............... 370/254 |
| 6,574,206 B2 | * | 6/2003 | Young ........................ 370/337 |
| 6,594,246 B1 | * | 7/2003 | Jorgensen ................... 370/338 |
| 6,600,754 B1 | * | 7/2003 | Young et al. ............... 370/459 |

OTHER PUBLICATIONS

P. 802.11 Draft Standard for Information Technology—Telecommunications and information exchange between systems—Local and metropolitan area networks=Specific requirements—"Part II: Wireless LAN Medium Access Control (MAC) and Physical Layer (PHY) Specifications," IEEE P802.11.D10 (Jan. 14, 1999).

Timothy J. Shepard, "A Channel Access Scheme for Large Dense Packet Radio Networks," Proceedings of ACM SIG-COMM '96, Stanford University, pp. 1–12 (Aug. 1996).

Imrich Chlamtac, Andras Farago and Hongbiao Zhang, "Time Spread Multiple–Access (TSMA) Protocols for Multihop Mobile Radio Networks," IEEE/ACM Transactions on Networking, vol. 5, No. 6, pp. 804–812 (Dec. 1997).

Ji–Her and Victor O K. Li, "An Optimal Topology—Transparent Scheduling Method in Multihop Packet Radio Networks," IEEE/ACM Transactions on Networking, vol. 6, No. 3, pp. 289–306 (Jun. 1998).

Chenxi Zhu and M. Scott Corson, "A Five–Phase Reservation Protocol (FPRP) for Mobile Ad Hoc Networks," Proceedings of IEE INFOCOM '98 (Jul. 1998).

Z. Tang and J.J. Garcia–Luna–Aceves, "Hop Reservation Multiple Access (HRMA) for Multichannel Packet Radio Networks," Proceedings of IEEE IC3N '98: Seventh International conference on Computer Communication Networks, Lafayette, Louisiana (Oct. 12–15, 1998).

I. Chamtac and A. Lerner, "Fair algorithms for maximal Link Activation in Multihop Radio Networks," IEEE Transactions on Communications, vol. Com–35, No. 7 (Jul. 1987).

A. Ephremides and T. Troung, "Scheduling Broadcasts in Multihop Radio Networks," IEEE Transactions on Communications, vol. COM–38, No. 4 (Apr. 1990).

Imrich Chlamtac and Andras Farago, "Making Transmission Schedules Immune To Topology Changes In Multi–Hop Packet Radio Networks", IEEE/ACM Transactions on Networking, vol. 2, No. 1, pp. 23–29 (Feb. 1994).

Durga R. Satapathy and Jon M. Peha "Etiquette Modification For Unlicensed Spectrum: Approach and Impact", Proceedings of the IEEE Vehicular Technology Conference, vol. 1, pp. 272–276 (May 1998).

J. Garcia–Luna–Aceves and Chane L. Fullmer, "Performance of Floor Acquisition Multiple Access in Ad–Hoc Networks".

Anthony Ephremides and Bruce Hajek, "Nformation theory and Communication Networks: An Unconsummated Union", IEEE Transaction on Information Theory, vol. 44, No. 6, pp 1 & 3 (Oct. 1996).

* cited by examiner

| HEADER INFORMATION (IF NEEDED) |||||
|---|---|---|---|---|
| # OF OUTGOING ASLs 32 | NODE ID FOR ASL₁ 34 | START SLOT FOR ASL₁ 36 | SLOT RANGE FOR ASL₁ 38 | DATA CHANNEL FOR ASL₁ 40 |
| FTL FOR ASL₁ 42 | E/R BIT FOR ASL₁ 44 | SCHEDULE PRIORITY FOR ASL₁ 46 | ... FOR OTHER ASLs ... ||

⋮

| # OF INBOUND ASLs 48 | NODE ID FOR ASL₁ 50 | START SLOT FOR ASL₁ 52 | SLOT RANGE FOR ASL₁ 54 | DATA CHANNEL FOR ASL₁ 56 |
|---|---|---|---|---|
| FTL FOR ASL₁ 58 | E/R BIT FOR ASL₁ 60 | SCHEDULE PRIORITY FOR ASL₁ 62 | ... FOR OTHER ASLs ... ||

(30)

⋮

| # OF ISRs 64 | START SLOT FOR ISR₁ 66 | SLOT RANGE FOR ISR₁ 68 | DATA CHANNEL FOR ISR₁ 70 | LISTENING/ NOT LISTENING FOR ISR₁ 72 |
|---|---|---|---|---|
| SCHEDULE PRIORITY FOR ISR₁ 74 | ... FOR OTHER ISRs ... ||||

⋮

| # OF ACTIVE 1-HOP NEIGHBORS 76 | MAC OF N₁ 78 | XLID OF N₁ 80 | RLID OF N₁ 82 | ... FOR OTHER Ns ... |
|---|---|---|---|---|

⋮

| # OF ACTIVE 1 & 2-HOP NEIGHBORS | MAC OF N₁ | MAC OF N₁ | MAC OF N₁ | ... FOR OTHER Ns ... |
|---|---|---|---|---|

(84)

| OTHER FIELDS (IF NEEDED) |
|---|

FIG. 3

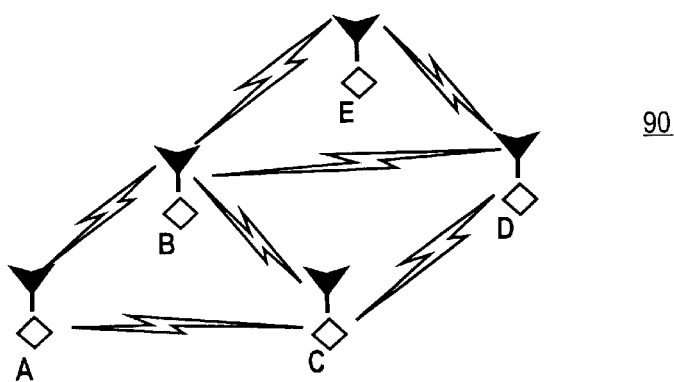
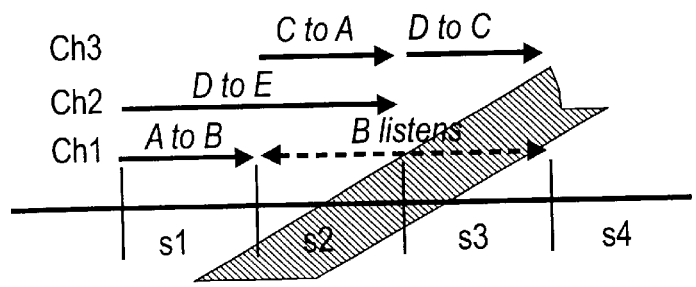
FIG. 4

PROTOCOL FOR NEIGHBORHOOD-ESTABLISHED TRANSMISSION SCHEDULING

STATEMENT OF GOVERNMENT LICENSE RIGHTS

The United States Government has a paid-up license in portions of this invention and the right in limited circumstances to require the patent owner to license others on reasonable terms as provided for by the terms of Contract No.: DAAH01-98-C-R005, awarded by the U.S. Army Aviation & Missile Command.

FIELD OF THE INVENTION

The present invention relates to the scheduling of transmissions without collisions in ad hoc computer networks with radio links, in which routers can have both hosts and networks attached to them.

BACKGROUND

Ad-hoc networks (i.e., multi-hop packet radio networks) are an ideal technology to provide a seamless extension of the Internet to the wireless mobile environment. In ad-hoc networks, nodes (e.g., stations or packet radios) can be mobile and communicate with one another either directly or through intermediate nodes, without relying on any preexisting network infrastructure. The self-configuring, dynamic-connectivity, multihop-propagation and fully-distributed nature of ad-hoc networks makes them very attractive for many new applications but also introduces difficult problems at the link and network layer.

Many medium-access control (MAC) protocols have been developed for wireless networks. The carrier-sense multiple access (CSMA) protocol was the first to be used in multihop packet-radio networks. A limitation of CSMA in multihop networks is that sources hidden from one another cannot detect their respective transmissions, which degrades CSMA's performance to that of the pure ALOHA protocol. F. A. Tobagi and L. Kleinrock, "Packet switching in radio channels: Part II—the hidden terminal problem in carrier sense multiple-access modes and the busy-tone solution," IEEE Trans. Commun., vol. COM-23, no. 12, pp. 417–33, 1975. Many MAC protocols have been proposed and implemented to solve the hidden-terminal problems of CSMA.

The hardware characteristics of packet-radios are such that a packet-radio cannot transmit and listen to the same channel simultaneously; therefore, collision detection (e.g., CSMA/CD as described in R. M. Metcalfe and D. R. Boggs, "ETHERNET: Distributed packet switching for local computer networks," Communications of the ACM, vol. 19, no. 7, pp. 395–403, 1976) cannot be used in a single-channel packet-radio network. The throughput of CSMA protocols is very good, as long as the multiple transmitters within range of the same receivers can sense one another's transmissions. Unfortunately, "hidden terminal" problems (see Tobagi et al., supra) degrade the performance of CSMA substantially, because carrier sensing cannot prevent collisions in that case.

The busy tone multiple access (BTMA) protocol, id., was the first proposal to combat the hidden-terminal problems of CSMA. BTMA is designed for station-based networks and divides the channel into a message channel and the busy-tone channel. The base station transmits a busy-tone signal on the busy-tone channel as long as it senses carrier on the data channel. Because the base station is within a line of sight to all terminals, each terminal can sense the busy-tone channel to determine the state of the data channel. The limitations of BTMA are the use of a separate channel to convey the state of the data channel, the need for the receiver to transmit the busy tone while detecting carrier in the data channel, and the difficulty of detecting the busy-tone signal in a narrow-band channel.

A receiver initiated busy-tone multiple access protocol for packet-radio networks has also been proposed. C. Wu and V. O. K. Li, "Receiver-initiated busy-tone multiple access in packet radio networks," ACM SIGCOMM 87 Workshop: Frontiers in Computer Communications Technology, Stowe, Vt., USA, Aug. 11–13 1987. In this scheme, the sender transmits a request-to-send (RTS) to the receiver, before sending a data packet. When the receiver obtains a correct RTS, it transmits a busy tone in a separate channel to alert other sources nearby that they should back off (i.e., refrain from transmitting). The correct source is always notified that it can proceed with transmission of the data packet. One of the limitations of this scheme is that it still requires a separate busy-tone channel and full-duplex operation at the receiver.

Several protocols have been proposed based on three-, four- or even five-way "collision-avoidance" handshakes done with small control packets and meant to avoid data collisions when sources of data packets cannot hear one another. The collision-avoidance approach in each of these schemes follows the basic philosophy first introduced by Tobagi and Kleinrock in SRMA (Split-Channel Reservation Multiple Access). F. A. Tobagi and L. Kleinrock, "Packet switching in radio channels: Part III—polling and (dynamic) split-channel reservation multiple access," IEEE Trans. Commun., vol. COM-24, no. 8, pp. 832–845, 1976. In SRMA, and subsequent collision-avoidance protocols, a sender node sends a request-to-send (RTS) packet to the intended receiver, either sensing the channel before sending the RTS or not sensing the channel before the RTS transmission. A receiver that hears a clean RTS responds with a clear-to-send (CTS), and the sender can send a data packet after hearing a clean CTS. Surprisingly, Tobagi and Kleinrock's work on SRMA is not referenced by most subsequent proposals based on collision avoidance.

Other collision-avoidance schemes that have been proposed include the following: U.S. Pat. No. 5,319,641 discloses a method to improve CSMA p-persistent protocols by introducing a random waiting time that stations must wait listening to the channel once they have packets to send. The method disclosed does not work in networks with hidden terminals. U.S. Pat. No. 4,661,902 discloses a method that amounts to an implementation of SRMA over a single channel in which stations use carrier sensing before sending RTSs. P. Karn, "MACA—a new channel access method for packet radio," in ARRL/CRRL Amateur Radio 9th Computer Networking Conference, pp. 134–40, ARRL, 1990 discloses a technique that amounts to SRMA running over a single channel in which a request-to-send (RTS) packet is sent without carrier sensing. Karn includes no description of how to support packet trains, however. U.S. Pat. No. 5,231,634 discloses a method that also applies SRMA's basic approach over a single channel. The RTS specifies the length of the impending data packet.

U.S. Pat. No. 5,502,724 discloses a method that extends the collision avoidance handshake to allow for multiple data packets to flow among a pair of communicating stations. A station that intends to establish a connection with a second station senses the channel. If the channel is idle, it sends a connection request (CR) packet to the intended receiver station. The CR specifies the number of data packets that the connection includes. The intended receiver sends a connection confirm (CC) packet to the sending station; the CC also specifies the number of packet in the connection. After the exchange of correct CR and CC packets the sending station may send one or multiple data packets and the receiving station may send an acknowledgment packet specifying which data packets were received correctly. To end the connection, the sending station sends a disconnect request (DR) and the receiving station issues a disconnect confirm (DC). Stations that receive a CR packet back off for an amount of time that is long enough for the advertised number of data packets to be sent to the receiver. After receiving a CR or CC, a station can attempt to access the channel when a timer proportional to the number of packets to be sent in the connection expire, or when it receives a DR or DC packet.

Some limitations with the method disclosed in U.S. Pat. No. 5,502,724 are that the method cannot ensure collision-fee transmissions of data packets, even with the transmission of CC packets by the receiver. The need for feedback from the receiver to its neighbors on a packet by packet basis was demonstrated by C. L. Fullmer and J. J. Garcia-Luna-Aceves in "Solutions to Hidden Terminal Problems in Wireless Networks", Proc. ACM SIGCOMM 97, Cannes, France, Sep. 14–18, 1997. Because the CC packet sent by the receiver may collide with another packet at a neighbor of a receiver, the CC packet does not provide sufficient feedback to hidden nodes; furthermore, the need for feedback packets to be longer than request packets was demonstrated by the same authors in "Floor Acquisition Multiple Access (FAMA) for Packet-Radio Networks," Proc. ACM SIGCOMM 95, Cambridge, Mass., Aug. 28–Sep. 1, 1995. Lastly, even though the disclosed method makes reference to broadcast packets sent to all the neighbors of a station, it provides no provisions to ensure that broadcast or multicast packets are received without interference by all the neighbors of a sending station.

U.S. Pat. No. 5,721,725 discloses a method similar to SRMA, and describes it to be an improvement over MACA. The method disclosed extends MACA by specifying in the RTS packets the desired data rate for data packets and allowing sender and receiver to negotiate the transmission data rate. As it is the case with other collision avoidance protocols discussed above, the method fails to guarantee collision free transmissions in networks with hidden terminals because no provisions are made on the length of the CTS being longer than the length of any RTS to ensure that collisions of RTSs and CTSs are detected by hidden stations.

DFWMAC IEEE802.11 (as described in K. C. Chen, "Medium Access Control of Wireless LANs for Mobile Computing," IEEE Network, vol. 8, no. 5, pp. 50–63, 1994 and P802.11—Unapproved Draft: Wireless LAN Medium Access Control (MAC) and Physical Specifications, IEEE, January 1996), FAMA-NCS (discussed in C. L. Fullmer and J. J. Garcia-Luna-Aceves, "Solutions to Hidden Terminal Problems in Wireless Networks", Proc. ACM SIGCOMM 97, Cannes, France, Sep. 14–18, 1997), and RIMA (described by J. J. Garcia-Luna-Aceves, in "Reversing the Collision Avoidance Handshake in Wireless Networks," Proc. ACM/IEEE Mobicom 99, August 1999) are three recent additional examples of collision-avoidance protocols. The scheme proposed in the draft 802.11 specification being considered by the Institute for Electrical and Electronic Engineers (IEEE) is a method very similar to SRMA with carrier sensing for the transmission of RTSs. The objective of FAMA-NCS is for a station that has data to send to acquire control of the channel in the vicinity of the receiver (which we call "the floor") before sending any data packet, and to ensure that no data packet collides with any other packet at the receiver. FAMA-NCS makes the length of CTSs much longer than the length of RTSs in order to detect the collision of RTSs with CTSs, which cannot be enforced in prior collision-avoidance protocols. RIMA consists of a family of protocols that reverse the collision-avoidance handshake method first introduced in SRMA and makes the receiver poll the sender of data.

Several other medium access control (MAC) protocols have been proposed for either single-channel wireless networks or wireline local area networks that are based on similar RTS-CTS exchanges, or based on RTSs followed by pauses. See, e.g., V. Bharghavan, et al., "MACAW: A Media Access Protocol for Wireless LANs," Proc. ACM SIGCOMM '94, pp. 212–25, London, UK, Aug. 31–Sep. 2, 1994; B. Vaduvur, "Access, Addressing and Security in Wireless Packet Networks," PhD thesis, University of California, Berkeley, Computer Science Department, 1995; A. Colvin, "CSMA with collision avoidance," Computer Commun., vol. 6, no. 5, pp. 227–35, 1983; W. F. Lo and H. T. Mouftah, "Carrier Sense Multiple Access with Collision Detection for Radio Channels," IEEE $13^{th}$ Int'l Commun. and Energy Conf.? pp. 244–47, IEEE, 1984; R. Rom, "Collision Detection in Radio Channels," Local Area and Multiple Access Networks, pp. 235–49, Computer Science Press, 1986; and G. S. Sidhu, R. F. Andrews, and A. B. Oppenheimer, Inside Apple Talk, Second Edition. Addison-Wesley Publishing Company, Inc., 1990.

Despite the popularity gained by collision-avoidance protocols and systems based on such protocols over the past few years, two key performance limitations of all collision-avoidance MAC protocols are: (a) they cannot provide channel-access delay guarantees, which represents a significant problem for real-time applications; and (b) they lack explicit support of collision-free multicasting or broadcasting, which implies that either a node must transmit the same multicast packet multiple times, once to each multicast-group neighbor, or packets are sent with likelihood of reception as low as the ALOHA protocol. In addition, collision-avoidance protocols require carrier sensing, which is not technically or economically feasible to implement in direct sequence spread spectrum radios with very high chip rates.

To circumvent hidden-terminal interference problems, unique codes (spreading codes or frequency-hopping sequences) can be assigned to receivers or senders. An example of this approach is the Metricom network. However, receiver oriented code assignment (ROCA) and transmitter oriented code assignment (TOCA) require either preconfiguring radios with the node-to-code mappings, or finding the codes being used by neighboring transmitters or receivers. Furthermore, efficient broadcasting is not guaranteed simply by establishing a TOCA approach, because all the neighbors of a transmitter must agree to listen to the transmitter at the same time to minimize the number of transmissions.

Another approach to channel access used in multihop wireless networks consists of establishing transmission schedules, i.e., allocating stations to different times and data channels (e.g., frequencies, spreading codes, or their combination) in a way that no collisions occur. Transmission scheduling can be static or dynamic; MAC protocols based on dynamic transmission scheduling explore the spatial reuse of the radio channel and thus have much higher channel utilization than such fixed scheduling approaches as TDMA and FDMA.

In TDMA protocols, time is divided into frames consisting of time slots. Time slots are allocated to specific nodes or a centralized station is used to allocate the time slots. The limitations of TDMA stem from the fixed assignment of time slots to nodes, which is slow to adapt to network changes and makes inefficient use of the channel if nodes are bursty sources of traffic, and the use of centralized assignments. There are many existing approaches based on dynamic TDMA methods in which stations use ALOHA, slotted ALOHA or other contention protocols in an uplink to request time slots from a base station. An example of this approach is the system disclosed in U.S. Pat. 5,638,371.

A number of protocols have been proposed in the recent past to provide dynamic time-slot allocation without requiring central base stations. These protocols can be classified as topology-independent and topology-dependent time scheduling protocols. Shepard (see, e.g., T. Shepard, "A Channel Access Scheme for Large Dense Packet Radio Networks," SIGCOMM '96 Conference Proc., ACM 1996; and U.S. Pat. No. 5,682,382), Chlamtac et al., "Time-Spread Multiple-Access (TSMA) Protocols for Multihop Mobile Radio Networks," IEEE/ACM Transactions on Networking, Vol. 5, no. 6, December, 1997, and Ji-Her Ju and Victor O. K. Li, "An Optimal Topology-Transparent Scheduling Method in Multihop Packet Radio Networks," IEEE/ACM Transactions on Networking, Vol. 6, no. 3, June 1998, have proposed topology-independent time-scheduling protocols. In these protocols, nodes are pre-assigned (by means of their nodal IDs, for example) or adopt a transmission schedule that they publish, and such a schedule specifies the times when a node transmits and receives. The protocols guarantee or provide a high likelihood that at least one transmission time in a node's schedule does not conflict with any node one or two hops away.

In the Chlamtac and Ju & Li approaches, nodes are unable to determine which transmissions will succeed, complicating the job of higher layer (e.g., link-layer) protocols. These approaches also require values for the total number of nodes in the network and maximum number of neighbors for each node, as input parameters to the algorithm, thus making them design for the worst case conditions (and thus, operate inefficiently if the network is not as dense as expected), or being sensitive to actual network conditions (if the network is larger or more dense than expected). Shepard's approach avoids collisions by assuming nodes are synchronized with their neighbors, have knowledge of their neighbors' schedules, and are able to receive from multiple transmitting neighbors simultaneously. This final assumption requires fairly sophisticated radio hardware.

Recently, C. Zhu and M. S. Corson, "A Five-Phase Reservation Protocol (FPRP) for Mobile Ad Hoc Networks," Proc. IEEE INFOCOM '98 and Tang and Garcia-Luna-Aceves (see, e.g., Z. Tang and J. J. Garcia-Luna-Aceves, "Hop-Reservation Multiple Access (HRMA) for Multichannel Packet Radio Networks", Proc. IEEE IC3N '98: Seventh International Conference on Computer Communications and Networks, Lafayette, Louisiana, Oct. 12–15, 1998) have developed topology-dependent scheduling protocols, such that a node acquires a transmission schedule that allows the node to transmit without interfering with nodes one and two hops away from itself, and such that channel reuse is increased as the number of neighbors per node decreases. These protocols require nodes to contend in order to reserve collision-free time slots, and the contention is done on each mini-slot. Furthermore, they rely on dividing each slot into several mini-slots. All this limits the minimum duration that slots may have.

Several other TDMA approaches that require an initial, topology-independent schedule, followed by communication among the network nodes to negotiate a final schedule. For example, I. Chlamtac, "Fair Algorithms for Maximal Link Activation in Multihop Radio Networks," IEEE Transactions on Communications, Vol. COM-35, no. 7, July, 1987 proposed an algorithm based on a repeating link schedule that can adapt to traffic demands after some number of iterations of the algorithm. The algorithm starts with a "single-slot-perlink" schedule, such as provided by assigning each node a transmission slot according to its node ID. At each iteration, schedule information and a scheduling "token" are routed up and down a routing tree (established by means of pre-existing algorithms), to assign additional slots to nodes or links according to their degree of unmet traffic demands.

A. Ephremides and T. Truong, "Scheduling Broadcasts in Multihop Radio Networks," IEEE Transactions on Communications, Vol. COM-38, No. 4, April, 1990 proposed a similar algorithm in which each node is initially assigned a slot corresponding to its node ID, and then each node uses its assignment to pass "skeleton" schedules to its neighbors. During the next two frames (two iterations of communicating schedules), and in accordance with fixed node priorities, nodes are able to reserve available slots until all available slots are taken (i.e., no more slots can be assigned without causing collisions). Because of the need for schedules that are relatively fixed, requiring a few iterations to converge, and of scheduling-frame size equal to the maximum size of the network, these approaches have limited scalability and robustness to mobility or other dynamics.

The approach proposed by Young (see C. David Young, "USAP: a unifying dynamic distributed multichannel TDMA slot assignment protocol", MILCOM '96 Conf. Proc., vol. 1, pp. 235–39, October 1996) also requires initial assignment of one slot per node, and then negotiation of scheduling packets for assignment of the other slots. However, the initially assigned slot is limited to the first slot in each "frame." Thus, each node's assigned slot occurs every N frames, where N is the maximum network size. Because of this, the approach is not scalable. Also, because a node needs to wait up to N frames before a proposed schedule addition is confirmed by a neighbor, the approach is relatively slow-adapting to dynamic traffic conditions.

SUMMARY OF THE INVENTION

In one embodiment, scheduling packets are exchanged among neighboring nodes of a computer network. These scheduling packets include descriptions of a transmitting node's 2-hop neighborhood within the computer network, and nodes are able to determine transmission schedules from information received via said scheduling packets. Preferably, the computer network is a synchronized network in which time is divided into a number of frames, each of which are made up of a plurality of slots. In such cases, the exchange of scheduling packets should occur within a first number of the slots of each frame, preferably in a common communication channel. Transmission schedules may be determined, at least in part, because nodes advertise their availability using the scheduling packets.

The above-mentioned descriptions may include an identification of received communication times and/or channels, an identification of requested communication times and/or channels and an identification of available communication times and/or channels. The requested communication times and/or channels should correspond to available times and/or channels advertised by one or more nodes of the computer network. In this scheme, the identification of reserved communication times and/or channels should be made after eliminating any conflicting scheduled transmissions for those communication times and/or channels.

A further embodiment allow for scheduling transmission times and/or channels at a node of a computer network according to previously reserved and requested transmission schedules received in packets transmitted by neighboring nodes of the computer network. Such packets are transmitted at the beginning of each frame period within the computer network and transmission times and/or channels are scheduled for periods indicated as being available according to information included in the packets. In one implementation of this scheme, previously reserved transmission schedules have precedence over the requested transmission schedules and conflicts between requested transmission schedules are resolved according to a priority scheme.

Under the priority scheme, requested broadcast transmissions have precedence over requested multicast or unicast transmissions. In turn, requested multicast transmissions have precedence over requested unicast transmissions. Any conflicts between requested transmissions of equal precedence based on transmission type are resolved according to schedule priority tickets included in the packets and accommodating requested transmission schedules takes precedence over reserving listening time at the node.

Still another embodiment involves determining a transmit/receive schedule at a node of a computer network by first monitoring a common communication channel within the computer network to determine from information included within packets transmitted within the common communication channel previously scheduled transmission times and/or channels and advertised listening times of neighboring nodes in the computer network. The information included within the packets should include a list of the neighboring nodes' scheduled outbound communications, a list of the neighboring nodes' scheduled inbound communications and a list of the neighboring nodes' idle communication periods. The list of the neighboring nodes' outbound communications may specify, for each outbound communication, an indication of the node to which the communication pertains, time parameters for the communication, channel parameters for the communication and a priority indication for the communication. Such a list may also include, for each outbound communication, an indication of whether the scheduled outbound communication has been established or requested. Similarly, the list of the neighboring nodes' inbound communications may specify, for each inbound communication, an indication of the node to which the communication pertains, time parameters for the communication, channel parameters for the communication, a priority indication for the communication and, optionally, an indication of whether the scheduled inbound communication has been established or requested.

Under this scheme then, the information included within packets transmitted within the common communication channel includes, for each packet transmitted by a node, a list of neighboring nodes of the node transmitting the subject packet. This list of neighboring nodes may specify MAC addresses of those neighboring nodes, local link identifiers assigned by the node transmitting the subject packet and/or one of its neighboring nodes.

In the present scheme, the transmit/receive schedule is determined using a working schedule made up of a set of valid transmission times and/or channels and a feasible schedule including a set of valid listening times and/or channels. The working and feasible schedules are updated upon receipt of each of the packets. In particular, the working schedule is updated according to a protocol in which established communication times and/or channels between nodes of the network take precedence over requested communication times and/or channels. Under this protocol communication schedules for broadcast transmissions take precedence over those for multicast transmissions which, in turn, take precedence over those for unicast transmissions. Moreover, nodes of the network may only schedule one communication session with other nodes of the network during a particular time/channel period. The feasible schedule is updated according to a protocol in which established and/or requested communication sessions between nodes of the network take precedence over listening times.

Any communication session between nodes of the network should occupy contiguous time periods over a designated channel. Requested communication sessions are added to the working schedule after verifying that the requested sessions can be accommodated using the feasible schedule.

In still another embodiment a computer network includes two or more nodes configured to schedule communication sessions amongst themselves according to information regarding other communication sessions within 2-hop neighborhoods of the nodes within the computer network received over a common communication channel within the computer network. The two or more nodes may be configured to schedule the communication sessions amongst themselves by choosing communication times and/or channels advertised as being available. Further, the nodes should be configured to maintain working schedules, which list valid transmission times and/or channels previously established or requested by nodes of the network, and feasible schedules, which list valid listening times and/or channels of nodes of the network. Thus, the two or more nodes may be configured to add their own requested communication sessions to their respective working schedules only after verifying availability of time/channel parameters of such requested communication sessions with information from their respective feasible schedules and to exchange working schedules as part of the informing transferred within the common communication channel.

BRIEF DESCRIPTION OF THE DRAWINGS

The present invention is illustrated by way of example, and not limitation, in the figures of the accompanying drawings in which like reference numerals refer to similar elements and in which:

FIG. 3 illustrates an example of a network scheduling packet configured in accordance with an embodiment of the present scheme; and FIG. 4 illustrates an example of the exchange of network scheduling packets within an ad-hoc network in accordance with an embodiment of the present invention.

DETAILED DESCRIPTION

Figure 1:
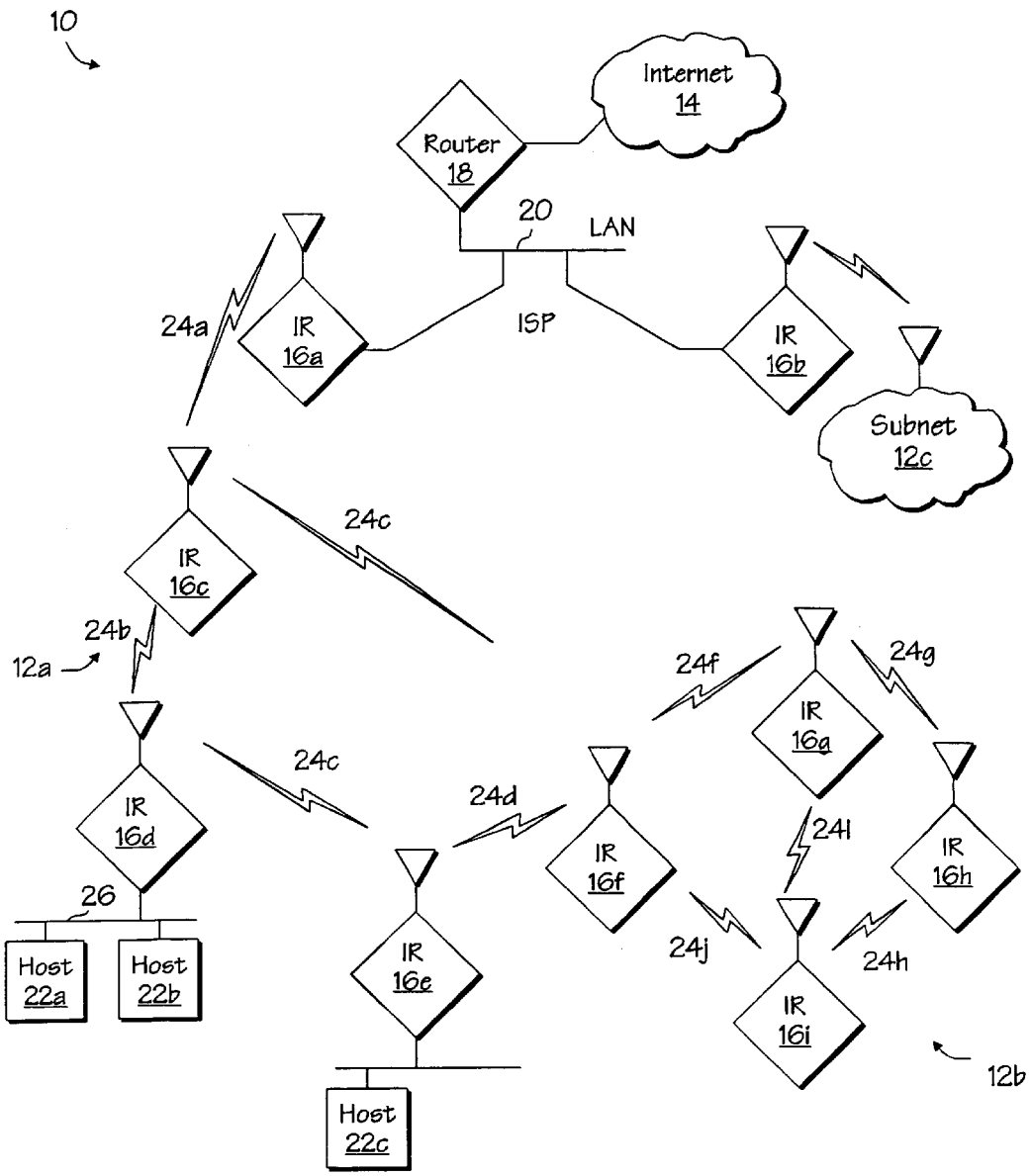
FIG. 1 illustrates an ad-hoc network that includes a number of sub-networks and an interconnection to the Internet through a router maintained by an Internet Service Provider (ISP)

A distributed transmission scheduling protocol for ad-hoc networks providing collision-free transfers of unicast, multicast and broadcast packets, and channel access delay guarantees is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

The present scheduling protocol will be referred to as the Neighborhood Established Transmission Scheduling (NETS) protocol, because it enables the nodes of an ad-hoc network to compute collision-free transmission schedules based solely on the information the nodes have about other nodes that exist in their 2-hop neighborhoods. NETS assumes a synchronous network (described below) organized into time frames divided into slots, and the use of a control method used to determine when the nodes of the computer network send their NETS schedule packets containing neighborhood information. The amount of synchronization assumed in the present invention is the same type of synchronization required in any network operating with frequency hopping radios, such as those designed to operate in ISM bands and commercially available today.

In one embodiment of the present invention, the control method used to determine when NETS schedule packets are transmitted is the adaptive communication protocol for wireless networking described in U.S. patent application Ser. No. 09/248,738, filed Feb. 2, 1999, assigned to the Assignee of the present invention and incorporated herein by reference. However, other distributed mechanisms can be used to instruct nodes when to transmit their NETS schedule packets, provided that the method used has a high likelihood that any one node in the network will communicate its NETS schedule packet to its neighbors within a short amount of time after the packet is ready for transmission.

Nodes exchange NETS schedule packets periodically according to the above-mentioned adaptive communication protocol or another method. A NETS schedule packet provides a summary description of the two-hop neighborhood of a node in terms of: all the known nodes in the 2-hop neighborhood of the transmitting node, the incoming and outgoing collision-free links of the node that have already been scheduled, the time slots and data channels where new links with the node can be reserved, and the time slots and data channels where the node will be listening while not active in scheduled links.

A deterministic scheduling algorithm in NETS allows each node to determine collision-free transmission schedules for itself and its 2-hop neighbors based on the information the node receives in NETS packets from its neighbors. This algorithm permits nodes to avoid choosing the same times and data channels for their schedule reservations. Nodes can send information to one another over those times and data channels where they advertise to be listening while not active in scheduled links.

NETS does not rely on the use of carrier sensing or mini-slots used in each slot to signal reservations of the slots, as is the case for several prior protocols (e.g., C. Zhu, M. S. Corson, "A Five-Phase Reservation Protocol (FPRP) for Mobile Ad Hoc Networks," Proc. IEEE INFOCOM '98). NETS does not require the assignment of unique random numbers representing unique transmission schedules that, as is the case in TSMA, ensure that at least one slot can be used for collision-free transmission by the node. The NETS algorithm for the computation of proposed scheduled links is deterministic, and the handshakes used to agree on schedules among nodes can also be deterministic.

I. Network Architecture

As explained above, in ad-hoc networks hosts and networks (e.g., local area networks or LANs) may be attached to packet radios (which will be referred to as Internet Radios (IRs) or nodes), which provide inter-node communication within the ad-hoc network. In contrast to conventional, wired networks, mobility of hosts and routers, and varying link and/or node conditions are often the rule, rather than the exception, in ad-hoc networks. FIG. 1 illustrates aspects of an exemplary ad-hoc network that will assist in understanding the remaining discussion.

Ad-hoc network 10 may be considered as a number of sub-networks 12a, 12b, 12c, which provide an extension of the Internet 14 through a number of IRs 16a–16i. Each IR 16a–16i may be a packet radio with an assigned IP address. In general, the IRs 16a–16i operate over a single channel using spread spectrum wireless communication techniques common in the art. For example, the IRs 16a–16i may operate in one of the unregulated UHF frequency bands, thereby obviating the need for operating licenses. As the figure illustrates, an IR is essentially a wireless IP router; with the exceptions that: a unique routing protocol that interacts through shared tables with the link-layer protocols in order to reduce control traffic and increase network efficiency may be used in place of conventional routing, neighbor management, link, and channel access protocols designed for the broadcast radio links 24a–24j of ad-hoc network 10 may be used in place of more conventional channel access protocols.

Coupling of ad-hoc network 10 to the Internet 14 may be achieved through a router 18, which may be operated by an Internet Service Provider (ISP). As shown, a single ISP may operate a LAN 20 to which multiple IRs are connected. In such a scheme, IRs 16a and 16b may act as "AirHeads", providing gateway service to Internet 14 via router 18. Some IRs, e.g., IRs 16d and 16e of FIG. 1, may be associated with hosts, 22a, 22b and 22c, that can be accessed by any Internet user through ad-hoc network 10.

Coordinating communications among IRs 16a–16i is an integrated protocol that performs all of the functions at the link and MAC layers of an Internet Radio Operating System (IROS). This protocol is described in detail in the above-cited co-pending application. It is sufficient for purposes of the present invention to recognize that the control protocol allows packets to be scheduled for transmission within ad-hoc network 10 in a predictable, collision-free manner, thereby avoiding potential collisions with "hidden-terminals," after the network has stabilized.

Figure 2:
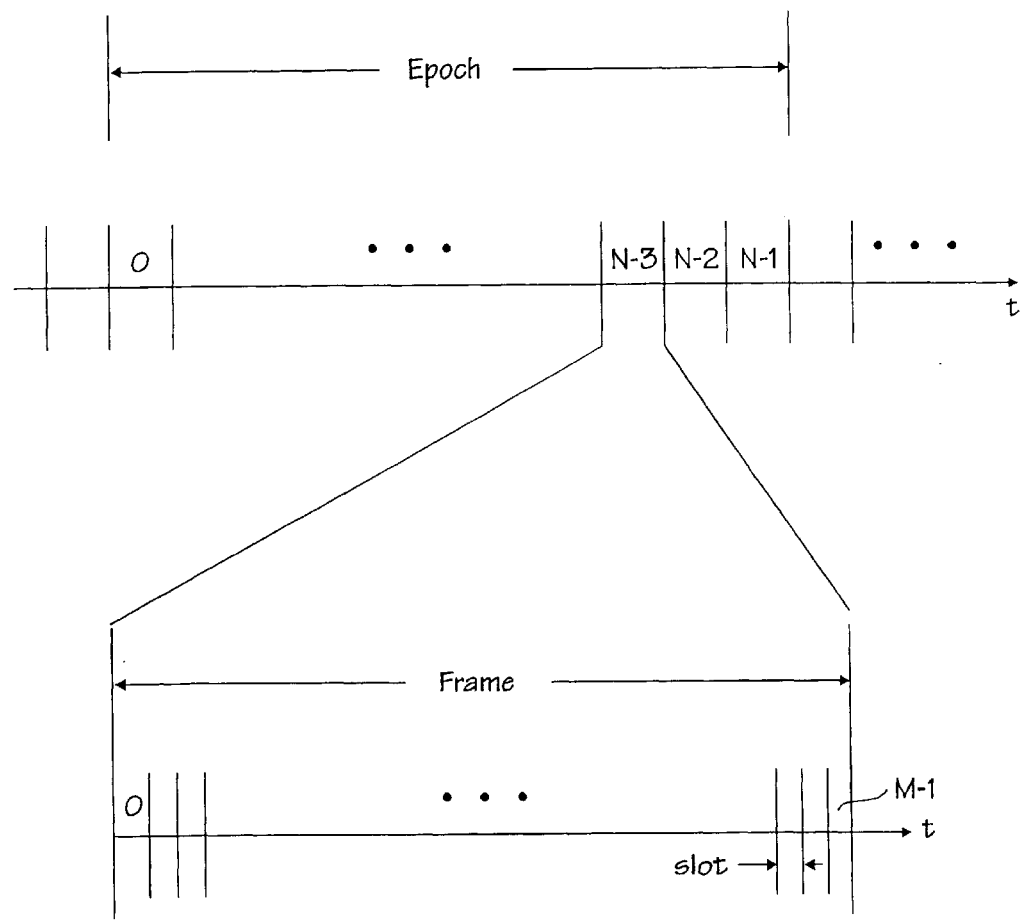
FIG. 2 illustrates a slot-frame-epoch methodology underlying the network architecture for the ad-hoc network shown in FIG. 1.

Ad-hoc network 10 is an example of a synchronized network where, as shown in FIG. 2, the nodes in the network agree on how time is divided into "slots" and then how slots are grouped into "frames". Although not required, frames may be further grouped into "epochs". Slots of a frame are numbered from 0 to M−1, while frames are numbered from 0 to N−1 frames per epoch. Transmissions (either individual packets or bursts of consecutive packets) are scheduled to coincide with the start of a slot.

A concept introduced above was that of a 2-hop neighborhood for a node. A node's 2-hop neighborhood includes all of the node's direct neighbors (i.e., single or 1-hop neighbors) and 2-hop neighbors. Direct (1-hop) neighbors are nodes that are able to communicate directly with the subject node and are typically learned by a neighbor discovery and management protocol, possibly in combination with MAC-layer control packets. 2-hop neighbors are nodes that are not direct neighbors, but are direct neighbors of one or more of the subject node's direct neighbors. 2-hop neighbors may be learned through routing protocol updates, but may also be learned more quickly as part of the control packets sent by the MAC-layer (as can be supported by the above-mentioned communications protocol, for instance). In FIG. 1 nodes 16c and 16e are two hops apart from one another (even when the separate possible paths are considered), while nodes 16a and 16e are further (i.e., three hops) apart.

II. Basic Service and Assumptions

In the present scheme, it is assumed that the radios used may be only half-duplex and may only be able to tune to one channel at a time, although they should be able to switch to any of the available channels. Like previous MAC protocols based on transmission scheduling, NETS assumes that time is slotted and that slots are grouped into frames, as shown in FIG. 2. Note, however, that even protocols based on collision avoidance (e.g., IEEE 802.11) may require that time be slotted and organized into frames, depending on the radios used in the network. Such is the case for frequency hopping radios, because all radios must agree on the start times of frequency hops and the length of the hopping sequence.

We also assume that multiple orthogonal data channels are available; these channels can be implemented by means of multiple frequency bands, direct-sequence or frequency-hopped spreading codes, or combinations of waveforms that combine such techniques. Because of the handshakes needed in NETS to make link reservations, NETS can use only bi-directional physical links; this is also true of collision-avoidance MAC protocols and is not a major limitation for the type of ad-hoc networks and radios for which NETS is intended.

To describe the operation of NETS, the term active scheduled link (ASL) is used to denote a reserved sequence of contiguous time slots with a specific start slot and an associated data channel, where a data channel can be a spreading code, a frequency hop sequence, a frequency band, a data rate, and combinations of these and other transmission parameters. Slots are allocated to ASLs on multiples of link units, where a link unit is the minimum number of contiguous s lots that a non-empty ASL can require. Hence, the slot range of an ASL is a-multiple of link units. Furthermore, the start slot of an ASL should be a number that is a multiple of link units. This is done to avoid orphan slots that cannot be allocated to any ASL. We note that an ASL specified for unicast transmissions has a transmitter and a receiver, and an ASL for multicast or broadcast transmissions has a transmitter and multiple receivers.

In one embodiment of this invention, each neighbor of a node is identified by the node using a transmitter-assigned local link identifier, which we denote by XLID. In another embodiment of this invention, nodes can be identified by their MAC addresses. In the description of the present invention presented herein, we simply use the term node identifier to denote either XLIDs or MAC addresses of nodes. NETS works correctly with either or both types of node identifiers.

Each node can have up to a maximum number of active one-hop neighbors. Each active one-hop neighbor is assigned a node identifier; and it is assumed that a node assigns consecutive node identifiers to active neighbors. With these and the above assumptions, the basic service provided by NETS includes reserving collision-free ASLs for unicasting, multicasting or broadcasting.

As mentioned above, the adaptive communication protocol that is the subject of the above-cited co-pending application may be used to determine when NETS schedule packets may be sent periodically by each node, depending on its two-hop neighborhood. According to this protocol, time is divided into frames of a known number of slots, and each frame is assigned a number that is known throughout the network. The first few slots of each frame are dedicated to the transmission of NETS schedule packets; such slots are called control slots. Nodes use a common channel during transmissions within such control slots, because NETS schedule packets must be transmitted in broadcast mode so that all the neighbors of a node can receive the NETS schedule packet sent by the node. The rest of the frame is used for the transmissions of data; the slots in the remaining portion of the frame are called data slots.

Establishing schedules in NETS is based on a few basic principles:

(a) Senders and receivers should be able to find one another easily. To accomplish this feat, when multiple channels are used a node in NETS should exchange NETS schedule packets in the control slots of each frame and should advertise the slots and channels for such slots where it can be reached outside existing ASLs.

(b) Data from a source should flow without interference from other sources over a reserved ASL, until conflicts due to mobility, errors due to the physical link, or the end of the flow are detected. Because of possible hidden terminals, the receiver(s) of an ASL should instruct other potential sources that the ASL is reserved.

(c) Links should be established over multiple available data channels. Because of possible hidden terminals, both sender and receiver(s) of a link should verify that the intended ASL does not interfere with other ongoing ASLs.

(d) The sender of a broadcast or multicast ASL should not have to receive explicit feedback on the reservation from each neighbor, other than the basic exchange of NETS schedule packets.

II. Information Exchanged and Maintained in NETS

FIG. 3 presents a canonical packet format, which illustrates the type of 2-hop neighborhood information used in the present invention, as well as the combination of the various types of information. Fields in the canonical packet can be required fields or optional fields. The uniqueness of the packets used in the present invention stems from the use in various combinations of local link identifiers or MAC addresses together with information about the requested or established ASLs. In addition to any header or other information which may be included, a NETS schedule packet 30 specifies:

(a) A list (e.g., signaled using a field 32 to specify the number included therein) of one or more outgoing ASLs, which specify ASLs used for the node to transmit to its neighbors; each such ASL is specified by:
 (1) The node identifier 34 assigned to the neighbor in the ASL;
 (2) The start slot 36 of the ASL;
 (3) The slot range 38 occupied by the ASL;
 (4) The data channel 40 used for the ASL;
 (5) The frames to live for the ASL (FTL) 42;
 (6) A bit 44 indicating if the ASL is established (0) or requested (1);
and
 (7) A schedule priority ticket 46 whose value is picked by the node.
(b) A list (e.g., signaled using a field 48 to specify the number included therein) of one or more incoming ASLs, which specify ASLs used for neighbors to transmit to the node; each such ASL is specified by:
  (1) The node identifier 50 assigned to the node by its neighbor in the ASL;
  (2) The start slot 52 of the ASL;
  (3) The slot range 54 occupied by the ASL;
  (4) The data channel 56 used for the ASL;
  (5) The frames to live for the ASL (FTL) 58;
  (6) A request bit 60 indicating if the ASL is established (0) or requested (1); and
  (7) A schedule priority ticket 62 whose value is picked by the neighbor.
(c) A list (e.g., signaled using a field 64 to specify the number included therein) of zero or more idle slot ranges (ISR), with each ISR specified by:
  (I) The start slot 66 of the ISR;
  (2) The slot range. 68 of the ISR;
  (3) The data channel 70 used for the ISR;
  (4) A bit 72 indicating if the node is listening on the ISR; and
  (5) A schedule priority ticket 74 whose value is picked by the node.
(d) An optional list (e.g., signaled using a field 76 to specify the number included therein) of one or more active one-hop neighbors, with each entry in the list consisting of:
  (1) The MAC address of a neighbor 78;
  (2) The XLID 80 given by the node to the link with the neighbor; and
  (3) The receiver link identifier (RLID) 82 given by the neighbor to the link with the node.
(e) An optional list (e.g., 84) of zero or more MAC addresses of one- and two-hop neighbors.

For simplicity, the ASLs and ISRs may be specified in an order defined by their start slots, with the ASL and ISR with the smallest start slot number going first in the respective list.

Slot ranges are specified in terms of link units. The schedule priority ticket is a random number used by nodes to determine which requested ASL (i.e., an ASL with request bit set to 1) seeking slots and a channel that overlap at least partially with other requested ASLs should win. One embodiment of the present invention may follow the simple rule that the proposed ASL with the smallest ticket value is assigned the slots and channel requested.

Depending on the bandwidth available for the exchange of NETS schedule packets, the dissemination of control information may be done incrementally, in which case multiple NETS packets may be used for a node to convey its 2-hop neighborhood information, or atomically, in which all two-hop neighborhood information is contained in a single NETS packet. Outgoing and incoming ASLs sent in a NETS packet are either links that have been agreed upon by all the nodes in a 2-hop neighborhood, or they can be proposed links requested by nodes. ISRs have lower priority than established or requested ASLs and are used for nodes to execute quick transactions and to indicate to nodes receiving a NETS schedule packet the slot ranges and associated channels that can be used to request ASLs with a given neighbor.

The information a node maintains about its 2-hop neighborhood includes:
  (a) The MAC addresses and associated node identifier of all its 1-hop neighbors.
  (b) The ASLs advertised by all its 1-hop neighbors.
  (c) The ISRs advertised by all its 1-hop neighbors.

The aggregate of ASLs constitute the working schedule of the 2-hop neighborhood of a node, and the ISRs constitute the choices the node should first try to use to request new ASLs with neighbors.

III. Transmission Scheduling

When and why collision-free ASLs need to be established are decisions made at a layer on top of NETS and the implementation details of a mechanism for making such decisions are not critical to the present invention. For convenience, we refer to all the data that must be transmitted by a node to one or multiple neighbors over a given ASL as a flow. Data packets in the same flow, therefore, can be addressed to different network-level destinations sharing the same relay node. The implementation details of a scheduling mechanism for such packets over an ASL are not critical to the present invention, however, it should be apparent to those of ordinary skill in the art that the ASLs established in NETS tend to be longer lasting than individual connections because they service multiple connections.

Because nodes in a two-hop neighborhood may have inconsistent scheduling information and send out their requests for ASLs concurrently, multiple requested ASLs may collide, e.g., more than one requested ASL sent by nodes during the same frame may specify conflicting slot ranges, data channels or intended receivers. The mechanisms introduced in prior schemes to handle the contention of transmission schedules fall in two categories: fixed allocation and random allocation. With fixed allocation, a sender or a receiver is assigned a unique code and such a code is associated with a transmission schedule guaranteed to ensure at least one collision-free transmission in a frame. With random assignment, nodes contend for links by picking them randomly and then deciding on the winner of the contention using different back off strategies or collision resolution strategies, which can be based on the unique addresses of the nodes.

In contrast to prior schemes, the present distributed transmission scheduling scheme, i.e., the establishment of ASLs in NETS, is based on a simple distributed election method that adheres to a novel etiquette of multi-channel channel reuse. The etiquette of channel reuse implemented in NETS attempts to avoid contention in the distributed selection of ASLs, provide quick resolution of conflicts among requested ASLs, incur the least amount of disruption to existing ASLs being used for flows, and avoid the case in which a node cannot establish an ASL even though there are slots with data channels available. This is accomplished without relying on assigning unique data channels or slots to sources or receivers to avoid or resolve contention, as it is done in several exiting protocols.

NETS allows nodes to communicate requested ASLs to their neighbors in two ways, which are not exclusive of each other:
  (a) A node can send out a bid for a requested ASL by advertising the requested ASL in its NETS schedule packets, such an ASL advertisement has the request bit set to one to indicate that it has lower priority with respect to ASLs already established.
  (b) A node can send a request for the ASL to its neighbor over one of the ISRs advertised by the neighbor.

The NETS etiquette of channel reuse is a listen-to-schedule before requesting approach and is based on the following rules:

Etiquette Rule 1: A node can request an ASL after listening in the control slots for a number of frames in order to obtain the current state of the 2-hop neighborhood.

Etiquette Rule 2: An incoming or outgoing ASL already established has precedence over any requested ASL that conflicts with the established ASL, unless a preemptive allocation must be made to avoid starvation.

Etiquette Rule 3: For two requested ASLs that conflict with one another, the following precedence rules must be observed:

3a) ASLs for broadcast transmissions have precedence over ASLs for multicast or unicast transmissions.

3b) ASLs for multicast transmissions have precedence over ASLs for unicast transmissions.

3c) Among the ASLs with the same precedence due to the type of transmission, the ASL with the smallest schedule priority ticket has precedence.

Etiquette Rule 4: No ASL to or from a given node may overlap on any time slot with another ASL to or from the same node.

Etiquette Rule 5: The slots of an ASL must be contiguous and the same data channel must be used for the entire ASL.

Etiquette Rule 6: ASLs have precedence over ISRs, and between two ISRs that use the same channel and overlap in at least one time slot, the ISR with the smallest schedule priority ticket has precedence.

Etiquette Rule 7: During any given time slot assigned for data transmission, a node that is not transmitting or receiving on an established ASL must be listening in one of its advertised ISRs.

Etiquette Rule 8: When node i needs to establish a new ASL with a neighbor j, it must choose one of the advertised ISRs from j in a way that does not conflict with any of the other etiquette rules.

Etiquette Rule 9: A node can transmit only over established ASLs

Etiquette Rule 10: Transmissions over an advertised ISR must be done using a listen-before-talk etiquette over the channel specified for the ISR.

Once a node has listened to the common control channel for a number of frames, it obtains the information it needs to decide which ASLs constitute the current schedule and which ISRs are valid. The set of all the valid ASLs constitute the working schedule of the node. The working schedule of node i is denoted by $WS\_i$. The set of all valid ISRs constitute the feasible schedule of the node. The feasible schedule of node i is denoted by $FS\_i$. Node i updates $WS\_i$ and $FS\_i$ when it receives a NETS schedule packet. To update $WS\_i$, node i applies Etiquette Rules 2 to 5 on each of the updated or new ASLs reported in a NETS schedule packet to determine which are the valid ASLs among all those reported by its neighbors and the ASLs originated by the node itself.

In one embodiment, this is accomplished using conflict classes defined for the slots of a frame. The conflict class associated with slot s at node i is denoted by $C\_i(s)$ and consists of all the valid proposed and established ASLs that include slot s in them. An element in $C\_i(s)$ corresponds to a pointer to a valid ASL. The list of ASLs in $C\_i(s)$ are indexed in ascending order according to the channel they use. For each updated or new ASL reported by a neighbor k in a NETS schedule packet, node i scans the conflict class of each slot in the slot range of the ASL from k. The ASL from k is determined invalid if any of the etiquette rules are violated in any of the slots of the ASL from k.

At the conclusion of this description is a pseudocode representation of this embodiment of the present invention. Included therein are the subroutines PSCODE_DEFS, PSCODE_NBR_UPDATE, PSCODE_SCHED_ISR and PSCODE_SCHED_ASL. PSCODE_DEFS describes the data structures used in the embodiment. PSCODE_NBR_UPDATE describes the procedure for update the local working schedule and the conflict classes from a schedule received from a neighbor, including both ASL and ISR updates. PSCODE_SCHED_ISR describes the method for scheduling the local ISR for a node, and PSCODE_SCHED_ASL describes the procedure for scheduling local ASL requests.

In another embodiment, conflict classes can be defined for each channel used in the system. A conflict class is then associated with a slot and a channel. The conflict class associated with slot s and channel ch at node i is denoted by $C\_i(s,ch)$ and consists of all the valid proposed and established ASLs that use channel ch and include slot s in them. An element in $C\_i(s,ch)$ corresponds to a pointer to a valid ASL. For each updated or new ASL reported by a neighbor k in a NETS schedule packet, node i picks the proper channel and scans the conflict class of each slot in the slot range of the ASL from k. The ASL from k is determined invalid if any of the etiquette rules are violated in any of the slots of the ASL from k.

To update $FS\_i$, node i applies Etiquette Rule 6 based on $WS\_i$, $FS\_i$ and the updated and new ISRs reported in the NETS schedule packet. Node i derives a feasible list for each neighbor using $FS\_i$; the feasible list associated with neighbor j at node i is denoted by $FS\_i(j)$. Such a feasible list consists of all the valid ISRs reported by neighbor j, as well as ISRs from j with a reduced slot range that makes the subset of the ISR valid. An element in $FS\_i(s)$ specifies a channel, a start slot and a slot range. The list is ordered according to the number of slots in the elements.

To request a new ASL with a neighbor j, node i first picks the ISR in $FS\_i(j)$ such that $ISR\_k$ has slot range larger than or equal to the slot range needed for the ASL. Then, the requested ASL is added to $WS\_i$. Finally, the requested ASL entry is added for the next NETS schedule update.

More sophisticated choices can be made among the valid ISRs from a neighbor, such as choosing the ISR entry in $FS\_i(j)$ that corresponds to time slots with the smallest number of ISRs from other neighbors.

To select which ISRs to report in its NETS schedule packets, node i monitors the utilization of each channel available. The utilization of a channel during a frame can be defined as the percentage of slots available in a frame, for example. Node i then selects those channels that are least utilized over a period of a few frames, and determines the ISRs that can exist over such channels according to the rules of the NETS etiquette. Node i updates the ISRs it announces over:those channels based on the ASL updates it receives in NETS schedule packets, and updates which channels to use to compute ISRs over periods of time encompassing a few frames.

Contentions for the same link units and channels to be used in different ASLs are resolved using Etiquette Rules 2 to 5. A node learns whether its requested ASL is accepted or not from the NETS packets sent by its neighbors. When node i receives confirmation from its neighbors that its requested ASL is accepted, it resets the request bit of the ASL. Nodes with conflicting ASLs must back off and choose alternative ASLs.

Consider the wireless network 90 shown in FIG. 4. For simplicity, the system is assumed to have three orthogonal channels (Ch1, Ch2 and Ch3) and the data portion of a frame is shown as consisting of four slots (S1, S2, S3 and S4). FIG. 4 shows the scheduling information available at node B. As the figure shows, node B has an established ASL with node A in channel 1 lasting for only slot 1. By means of NETS schedule packets, node B also knows that there is an established ASL from D to E on channel 2 during slots 1 and 2, an established ASL from C to A in channel 3 during slot 2, and a proposed ASL from D to C over channel 3 during slot 3.

Based on this scheduling information, Node B determines that channel 1 is the least utilized and includes an ISR in its own NETS schedule packet stating that it will be listening over channel 1 during slots 2 to 4. The NETS schedule packet from B includes only the established ASL from A to B in channel 1 during slot 1. This NETS packet is received by nodes A, C, D, and E.

Similarly, the NETS schedule packet from node C contains the established ASL from C to A over channel 3 during slot 2, the proposed ASL from D to C over channel 3 during slot 3, and an ISR indicating that C is listening over channel 3 during slot 4.

Based on the NETS schedule packets that node A receives from nodes B and C, if node A is required to establish another ASL with node B lasting two slots, it uses the ISR from B and knows to pick slots 3 and 4 over channel 1, which ASL does not conflict with any established ASL. Node A then sends a NETS schedule packet with an established ASL from A to B over channel 1 during slot 1, an established ASL from C to A over channel 3 during slot 2, and a proposed ASL from A to B over channel 1 during slots 3 and 4. In this simple example, node A does not have any time slots available to communicate an ISR.

The listen-before-talk etiquette applied to ISRs can be as simple as using carrier sensing, or it can involve a collision avoidance and collision resolution handshake between a sender and the receiver of the ISR, and carried out over multiple frames. A node can start interacting with a neighbor over an ISR reported by the neighbor. In one embodiment of this invention, a node can send a request for ASL (RFA) to its neighbor over the ISR. The neighbor can respond to the RFA in the next frame with an ASL with the request bit set to 0; during the same frame, the node also sends a requested ASL corresponding to the slot range and channel of the ISR. This expedites the establishment of the ASL between the two nodes, because the two nodes start reporting the ASL to their neighbors starting with the frame following the RFA.

Another use of ISRs in the present invention consists of a simple collision avoidance handshake between nodes for transactions that need not merit the establishment of ASLs. According to this part of the present invention, a node sends an RTS to a neighbor over an ISR reported by the neighbor; the node may or may not use carrier sensing over the channel of the ISR to reduce collisions. The RTS sent by the node specifies the number of frames that are needed for the exchange and an ISR that the intended receiver may use to send a CTS to the sender. If the RTS is successful, the sender can send data packets over the advertised ISR for the number of frames agreed in the RTS-CTS exchange.

Thus, a scheme for the establishment of transmission schedules in an ad-hoc network has been described. Although discussed with reference to certain illustrated embodiments, however, the more general applicability of the claims that follow the pseudocode listing below should not be limited thereby.

```
// Neighborhood Established Scheduling Pseudocode
// PSCODE_DEFS: Definitions and Data structures
maxsl          = maximum slots in a scheduled frame;
WS[maxsl]      = local list of ASLs (working SChedule);
```

-continued

```
FS[maxsl]       = local feasable schedule list;
CS[maxsl]       = local conflict class list;
maxnbr          = maximum neighborhood size;
nbrList         = list of local one hop neighbor information;
multicastNbrs   = list of multicast group participants;
typedef struct {
    nbrId;          // neighbor node ID
    startSlot;      // starting slot for this ASL
    slotRange;      // number of this is effective
    dataChannel;    // data channel to transmit on
    ftl;            // frames to live
    reqBit;         // request bit
    pTicket;        // priority ticket
} ASL;
typedef struct {
    startSlot;      // starting slot for this ASL
    slotRange;      // number of this is effective
    dataChannel;    // data channel to transmit on
    listenBit;      // listening bit
    pTicket;        // priority ticket
} ISR;
typedef struct {
    MacAdr;         // MAC address for nbr
    nbrID;          // local neighbor identifier
    ASL_list[maxsl]; // ASL list for nbr
    ISR_list[maxsl]; // ISR list for nbr
} NBR;
// PSODE_NBR_UPDATE: Procedure for receiving and update from
a neighbor
RcvNbrAslUpdate( nbr, nbrSched )
{
    ASL *nbrAsl = NULL;
    ASL *csAsl = NULL;
    ASL *tmpAsl = NULL;
    // validate each entry
    nbrAsl = nbrSched->firstEntry( );
    while( nbrAsl != NULL ) //---------------------------------
    {
        // Etiquette rules 2 through 5
        // check conflicts for each slot in range
        for (slot = nbrAsl->startSlot;
             slot > (nbrAsl->startSlot + nbrAsl->slotRange);
             slot++)   //---------------------------------
        {
            // check conflict class list
            csAsl = CS[slot]->firstEntry( );
            while(csAsl != NULL) //---------------------------
            {
                // check for request precendence
                if(nbrAsl->reqBit) //---------------------------
                {
                    // Etiquette Rule #4
                    if(myId == csAsl->source II
                        myID == csAsl->destination II
                        nbrAsl->dataChannel ==
                        csAsl->dataChannel)
                    {
                        // conflict with local schedule
                        // Etiquette Rule #2
                        if(!csAsl->reqBit)
                        {
                            // local entry is established
                            // no pass
                            goto NEXT_ASL;
                        }
                        else // check for request priority
                        {
                            // Etiquette Rule 3 (and all its parts)
                            switch (nbrAsl->nbrId)
                            {
                                case brpadcast Addr:
                                    if(csAsl->nbrId == broadcastAddr)
                                    {
                                        // resolve tie with tickets
                                        if( ticketWinner(nbrAsl,
                                                csAsl) )
                                        {
                                            // nbrAsl is the winner
                                            here
```

```
                    tagConflict(csAsl);
                }
                else
                {
                    // nbrAsl is out
                    goto NEXT_ASL;
                }
            }
            else
            {
                tagConflict(csAsl);
            }
            break;
        case multicastAddr:
            if(csAsl->nbId == multicastAddr)
            {
                // resovle tie with tickets
                if( ticketWinner(nbrAsl,csAsl)
                {
                    // nbrAsl is the winner
                    here
                    tagConflict(csAsl);
                }
                else
                {
                    // nbrAsl looses
                    goto NEXT_ASL;
                }
            }
            else if (csAsl != broadcastAddr)
            {
                tagConflict(csAsl);
            }
            else
            {
                // nbrAsl looses
                goto NEXT_ASL;
            }
            break;
        default;
            if((csAsl->nbrId !=
                broadcastAddr) &&
                (csAsl->nbrId ==
                multicastAddr))
            {
                // resovle tie with tickets
                if( ticketWinner(nbrAsl,
                    csAsl) )
                {
                    // nbrAsl is the winner
                    here
                    tagConflict(csAsl);
                }
            }
            else
            {
                // nbrAsl looses
                goto NEXT_ASL;
            }
            break;
        }
    }
    // else no conflict.. carry on
} // if nbrAslreqBit -------------------------------
else // acknowledge accepted entry --------------------
{
    // Etiquette Rule #4
    if(myId == nbrAsl->source ||
       myId == Asl-> destination ||
       nbrAsl->dataChannel == csAsl->dataChannel)
    {
        // conflict with local schedule
        // Etiquette Rule #2
        if(csAsl->reqBit)
        {
            // remote entry is established
            // tag csAsl entry as looser
            tagConflict(csAsl);
```

```
            goto NEXT_ASL;
        }
        else // check for request priority
        {
            // Etiquette Rule 3 (and all its parts)
            switch (nbrAsl->nbrId)
            {
            case broadcastAddr:
                if(csAsl->nbrId == broadcastAddr)
                {
                    // resovle tie with tickets
                    if( ticketWinner(nbrAsl,
                        csAsl) )
                    {
                        // nbrAsl is the winner
                        here
                        tagConflict(csAsl);
                    }
                    else
                    {
                        // nbrAsl is out
                        goto NEXT_ASL;
                    }
                }
                else
                {
                    tagConflict(csAsl);
                }
                break;
            case multicastAddr:
                if(csAsl->nbrId == multicastAddr)
                {
                    // resovle tie with tickets
                    if( ticketWinner(nbrAsl,
                        csAsl) )
                    {
                        // nbrAsl is the winner
                        here
                        tagConflict(csAsl);
                    }
                    else
                    {
                        // nbrAsl looses
                        goto NEXT_ASL;
                    }
                }
                else if (csAsl != broadcastAddr)
                {
                    tagConflict(csAsl);
                }
                else
                {
                    // nbrAsl looses
                    goto NEXT_ASL;
                }
                break;
            default:
                if((csAsl->nbrId !=
                    broadcastAddr) &&
                    (csAsl->nbrId != multicastAddr))
                {
                    // resovle tie with tickets
                    if( ticketWinner(nbrAsl,
                        csAsl) )
                    {
                        // nbrAsl is the winner
                        here
                        tagConflict(csAsl);
                    }
                }
                else
                {
                    // nbrAsl looses
                    goto NEXT_ASL;
                }
                break;
            }
        }
    }
}
```

```
                // else no conflict.. carry on
            } // if nbrAsl !reqBit ----------------------
            // get next csAsl entry
            csAsl = CS[slot]->nextEntry( );
        } // while csAsl loop ----------------------
        // get next slot
    } // for each slot loop ------------------------
    // good entry
    // remove conflict ASL from conflict class list and
    //   from working schedule
    DeleteTagAslConflicts ( );
    // enter this ASL into the working schedule
    AddRequest(nbr, nbrId, slot, requestedRange);
    // enter this ASL onto the conflict class list
    AddConflictList (nbrAsl);
NEXT_ASL: // bail out of current nbrAsl ###############
    // clear conflict tags
    clearConflictTags( );
        // get next schedule entry
        nbrAsl = nbrSched->nextEntry( );
    } // while nbrAsl loop ----------------------------
}
// Procedure to update feasible list from nbr packet list
// ---------------------------------------------------------
RcvNbrIsrUpdate ( nbr, isrSched )
{
    ISR * nbrIsr = NULL;
    ISR * fsIsr = NULL;
    ASL * ssAsl = NULL;
    int slot  = 0;
    boolean fail = TRUE;
    nbrIsr = isrSched->firstEntry( );
    while(nbrIsr != NULL)
    {
        for(slot = nbrIsr->startSlot;
            slot < (nbrIsr->startSlot + nbrIsr->slotRange);
            slot ++)
        {
            // search through conflict class list first
            if( conflictChannel(slot,nbrIsr->channel) )
            {
                // ISR cut short
                break;
            }
        }
        slotRange = slot - nbrIsr->startSlot;
        if(slotRange > 1)
        {
            // modify slot range -- may have been truncated
            nbrIsr->slotRange(slotRange);
            // add this to feasible schedule
            AddISR(nbrIsr);
        }
        nbrIsr = isrSched->nextEntry( );
    }
}
// Procedure to scan conflict list for a channel conflict
// -- used by RcvNbrIsrUpdate function
// -------------------------------------------------------
boolean
ConflictChannel( slot,channel )
{
    ASL * csAsl = NULL;
    csAsl = CS[slot]->firstEntry( );
    while(csAsl != NULL)
    {
        if(csAsl->channel == channel)
            return TRUE;
        else
            csAsl = CS[slot]->nextEntry( );
    }
    return FALSE:
}
// PSCODE_SCHED_ISR: Procedure for scheduling local ISR in
working schedule
ScheduleISR ( )
{
    int slot, startSlot, slotRange, channel;
    // search through by slot to find idle zones
    for(slot = 0; slot < maxsl; //)
    {
        // find next idle slot
        if(WS[slot]!= NULL)
        {
            slot ++
            continue; // ASL in this slot
        }
        else
        {
            startSlot = slot;
            // find slot range (length of idle time)
            while(WS[slot] == NULL && (slot < maxsl)) slot++;
            // set range
            slotRange = slot - startSlot;
            // find least utilized channel for this range
            channel = bestChannel(startSlot, slotRange);
            // add to local WS
            AddLocalISR(startSlot, slotRange, channel);
        }
    }
}
// PSCODE_SCHED_ASL: Procedure for requesting Active
Scheduled Link (ASL)
boolean
ScheduleActiveLink( nbrId, requestedRange )
{
    ISR * nbrIsr;
    NBR *nbr;
    // broadcast schedule request
    if(nbrId == brodcastAddr)
    {
        int slot;
        // query conflct class for open slot range
        if(scanConflictList(broadcasAdr, &slot, requestedRange))
        {
            AddRequest(nbr, broadcastAddr, slot,
                requestedRange);
            return TRUE;
        }
    }
    // multicast schedule request
    else if (nbrId == multicastAddr)
    {
        int slot;
        // query conflict class for open slot range
        if(scanConflictList(multicastAdr,&slot,
            requestedRange))
        {
            AddRequest(nbr, multicastAddr, slot,
                requestedRange);
            return TRUE;
        }
    }
    else
    {
        // unicast schedule with nbr
        nbr  = nbrList[nbrId];
        nbrIsr = nbr->ISR_list->firstEntry( );
        while(nbrIsr != NULL)
        {
            if( nbrIsr->slotRange >= requestedRange )
            {
                AddRequest(nbr, nbrId, nbrIsr->startSlot,
                    requestedRange);
                return TRUE;
            }
            nbrIsr = nbr->ISR_list->nextEntry( );
        }
    }
    return FALSE;
}
```

What is claimed is:

1. A method, comprising exchanging scheduling packets among neighboring nodes of a synchronized wireless network in which time is divided into slots and the slots are grouped into frames, the scheduling packets including descriptions of active scheduled links (ASLs) between a transmitting node and its neighboring nodes, the ASLs corresponding to a reserved group of contiguous slots having a specific start slot and an associated data channel; and, determining a transmission schedule from information received via said scheduling packets.

2. The method of claim 1 wherein the descriptions further identify nodes within said transmitting node's 2-hop neighborhood by way of a node identifier.

3. The method of claim 2 wherein the exchange of scheduling packets occurs within a first number of the slots of each frame.

4. The method of claim 1 wherein transmitting nodes advertise availability using the scheduling packets.

5. The method of claim 1 wherein the scheduling packets are exchanged in a common channel.

6. The method of claim 5 wherein the scheduling packets are exchanged over initial portions of frame periods within the network.

7. The method of claim 1 wherein the descriptions further identify which of the ASLs are established.

8. The method of claim 7 wherein the descriptions identify which of the ASLs are requested.

9. The method of claim 8 wherein the descriptions identify idle slot ranges (ISRs).

10. The method of claim 1 wherein the descriptions further comprise a list of incoming ASLs relative to the transmitting node.

11. The method of claim 10 wherein the descriptions further comprise a list of outgoing ASLs relative to the transmitting node.

12. A method, comprising scheduling transmission times and/or channels at a node of a computer network according to previously reserved and requested transmission schedules received in packets transmitted by neighboring nodes of the computer network, each of said neighboring nodes describing its 2-hop neighborhood through those of said packets it transmits, said describing including identifiers for nodes residing at a 2-hop periphery within said 2-hop neighborhood.

13. The method of claim 12 wherein the packets are transmitted at known periods of time within each frame period within the computer network.

14. The method of claim 12 wherein transmission times and/or channels are scheduled for periods indicated as being available according to information included in the packets.

15. The method of claim 12 wherein the previously reserved transmission schedules have precedence over the requested transmission schedules.

16. The method of claim 12 wherein conflicts between requested transmission schedules are resolved according to a priority scheme.

17. The method of claim 16 wherein under the priority scheme, requested broadcast transmissions have precedence over requested multicast or unicast transmissions.

18. The method of claim 17 wherein under the priority scheme, requested multicast transmissions have precedence over requested unicast transmissions.

19. The method of claim 17 wherein under the priority scheme, conflicts between requested transmissions of equal precedence based on transmission type are resolved according to schedule priority tickets included in the packets.

20. The method of claim 12 wherein accommodating requested transmission schedules takes precedence over reserving listening time at the node.

21. A method, comprising determining a transmit/receive schedule at a node of a computer network by first monitoring a common communication channel within the computer network to determine from information included within packets transmitted within the common communication channel previously scheduled transmission times and/or channels and advertised listening times of neighboring nodes in the computer network, those of said packets transmitted by a neighboring node describing said neighboring node's 2-hop neighborhood to said node so as to include node identifiers for nodes two hops distant from said neighboring node.

22. The method of claim 21 wherein the information included within packets transmitted within the common communication channel comprises a list of the neighboring nodes' scheduled outbound communications, a list of the neighboring nodes' scheduled inbound communications and a list of the neighboring nodes' idle communication periods.

23. The method of claim 22 wherein the list of the neighboring nodes' outbound communications comprises, for each outbound communication, an indication of the node to which the communication pertains, time parameters for the communication, channel parameters for the communication and a priority indication for the communication.

24. The method of claim 23 wherein the list of the neighboring nodes' outbound communications further comprises, for each outbound communication, an indication of whether the scheduled outbound communication has been established or requested.

25. The method of claim 22 wherein the list of the neighboring nodes' inbound communications comprises, for each inbound communication, an indication of the node to which the communication pertains, time parameters for the communication, channel parameters for the communication and a priority indication for the communication.

26. The method of claim 25 wherein the list of the neighboring nodes' inbound communications further comprises, for each of the inbound communications, an indication of whether the scheduled inbound communication has been established or requested.

27. The method of claim 21 wherein the node identifiers further comprise media access control (MAC) addresses.

28. The method of claim 21 wherein the node identifiers further comprise local link identifiers.

29. The method of claim 21 wherein the transmit/receive schedule is determined using a working schedule comprising a set of valid transmission times and/or channels and a feasible schedule comprising a set of valid listening times and/or channels.

30. The method of claim 29 wherein the working and feasible schedules are updated upon receipt of each of the packets.

31. The method of claim wherein the working schedule is updated according to a protocol in which established communication times and/or channels between nodes of the network take precedence over requested communication times and/or channels.

32. The method of claim 31 wherein under the protocol communication schedules for broadcast transmissions take precedence over those for multicast transmissions which, in turn, take precedence over those for unicast transmissions.

33. The method of claim 32 wherein under the protocol nodes of the network may only schedule one communication session with other nodes of the network during a particular time/channel period.

34. The method of claim 33 wherein any communication session between nodes of the network must occupy contiguous time periods over a designated channel.

35. The method of claim 30 wherein the feasible schedule is updated according to a protocol in which established and/or requested communication sessions between nodes of the network take precedence over listening times.

36. The method of claim 30 wherein requested communication sessions are added to the working schedule after verifying that the requested sessions can be accommodated using the feasible schedule.

37. A method, comprising:
in a wireless network in which time is divided into slots and slots are grouped into frames:
sending one or more schedule packets from a node within said network that identify:
active scheduled links (ASLs) between said node and said node's neighbors, said neighbors being identified with node identifiers, said ASLs corresponding to a reserved group of contiguous slots having a specific start slot and an associated data channel.

38. The method of claim 37 wherein multiple slots of each frame are reserved for sending schedule packets amongst nodes within said wireless network.

39. The method of claim 37 wherein at least one of said schedule packets further comprise a list of outgoing ASLs for said node to transmit to its neighbors.

40. The method of claim 39 wherein said list at least partially specifies an outgoing ASL by a node identifier assigned to the neighbor associated with said outgoing ASL.

41. The method of claim 40 wherein said list at least partially further specifies said outgoing ASL by an indication as to whether said outgoing ASL is established or requested.

42. The method of claim 41 wherein said list at least partially further specifies said outgoing ASL by the slot range occupied by said outgoing ASL.

43. The method of claim 39 wherein said at least one of said schedule packets further comprise a list of incoming ASLs for said node's neighbors to transmit to said node.

44. The method of claim 43 wherein said list of incoming ASLs at least partially specifies an incoming ASL by a node identifier assigned to said node by the neighbor associated with said incoming ASL.

45. The method of claim 44 wherein said list of incoming ASLs at least partially further specifies said incoming ASL by an indication as to whether said incoming ASL is established or requested.

46. The method of claim 45 wherein said list of incoming ASLs at least partially further specifies said incoming ASL by the slot range occupied by said incoming ASL.

47. The method of claim 37 wherein said elements further include: idle slot ranges (ISRs) within said 2-hop neighborhood.

48. The method of claim 47 wherein said list of ISRs at least partially specifies an ISR by an indication as to whether or not said node is listening on said ISR.

49. The method of claim 37 herein said one or more schedule packets are a plurality of schedule packets.

50. The method of claim 37 wherein said one or more schedule packets is a single schedule packet.

51. The method of claim 37 wherein said node's 2-hop neighborhood is described by said node at least in terms of all known nodes in said node's 2-hop neighborhood.

52. A method, comprising: in a wireless network in which time is divided into slots and where slots are grouped into frames, and where multiple slots of individual frames are reserved for sending schedule packets amongst nodes within said wireless network:
receiving schedule packets at a node within said network, said schedule packets including descriptions of active scheduled links (ASLs), said ASLs corresponding to a reserved group of contiguous slots having a specific start slot and an associated data channel; and,
building, at said node, an understanding of said node's 2-hop neighborhood from information contained in said one or more schedule packets.

53. The method of claim 52 wherein said understanding further comprises node identifiers of all of said node's 1-hop neighbors.

54. The method of claim 52 wherein said understanding further comprises the ASLs advertised by all of said node's 1-hop neighbors.

55. The method of claim 54 wherein a first portion of said ASLs are established and a second portion of said ASLs are requested.

56. The method of claim 52 wherein said understanding further comprises the ISRs advertised by all of said node's 1-hop neighbors.

57. The method of claim 52 wherein said understanding further comprises:
1) node identifiers of all of said node's 1 hop neighbors;
2) the ASLs advertised by all of said node's 1-hop neighbors;
3) the ISRs advertised by all of said node's 1-hop neighbors.

58. The method of claim 57 wherein a first portion of said ASLs are established and a second portion of said ASLs are requested.

59. The method of claim 52 wherein said multiple slots further comprises a first few slots of each of said frames.

60. The method of claim 52 wherein each of said schedule packets further comprise, relative to its corresponding transmitting node, a list of outgoing active scheduled links (ASLs) for the transmitting node to transmit to its neighbors.

61. The method of claim 60 wherein said list at least partially specifies an outgoing ASL by a node identifier assigned to the neighbor associated with said outgoing ASL.

62. The method of claim 61 wherein said list at least partially further specifies said outgoing ASL by an indication as to whether said ASL is established or requested.

63. The method of claim 62 wherein said list at least partially further specifies said outgoing ASL by the slot range occupied by said outgoing ASL.

64. The method of claim 60 wherein each of said schedule packets further comprise, relative to its corresponding transmitting node, a list of incoming ASLs for said transmitting node's neighbors to transmit to said transmitting node.

65. The method of claim 64 wherein said list of incoming ASLs at least partially specifies an incoming ASL by a node identifier assigned to said transmitting node by the neighbor associated with said incoming ASL.

66. The method of claim 65 wherein said list of incoming ASLs at least partially further specifies said incoming ASL by an indication as to whether said incoming ASL is established or requested.

67. The method of claim 66 wherein said list of incoming ASLs at least partially further specifies said incoming ASL by the slot range occupied by said incoming ASL.

68. The method of claim 64 wherein said at least one of said schedule packets further comprise a list of idle slot ranges (ISRs).

69. The method of claim 68 wherein said list of ISRs at least partially specifies an ISR by an indication as to whether or not said node is listening on said ISR.

70. A method, comprising:
in a wireless network in which time is divided into slots and where slots are grouped into frames, and where schedule packets sent between nodes in said network identify established active scheduled links (ASLs) and requested ASLs, and where said ASLs correspond to a reserved group of contiguous slots having a specific start slot and an associated data channel:
  adhering to etiquette rules, at a plurality of nodes within said network, to implement a distributed listen-to-schedule before requesting channel reuse approach, said etiquette rules comprising:
    1) a node can request an ASL after listening to slots containing schedule packet information for a number of frames in order to obtain the current state of its 2-hop neighborhood; and,
    2) an already established ASL has precedence over any requested ASL that conflicts with the already established ASL.

71. The method of claim 70 wherein said etiquette rules further comprise:
  For two requested ASLs that conflict with each other:
    1) ASLs for broadcast transmission have precedence over ASLs for multicast or unicast transmission;
    2) ASLs for multicast transmission have precedence over ASLs for unicast transmission;
    3) Among the ASLs with the same precedence due to the type of transmission, the ASL with the smallest schedule priority ticket has precedence.

72. The method of claim 70 wherein said etiquette rules further comprise:
  No ASL to or from a given node may overlap on any time slot with another ASL to or from the same node.

73. The method of claim 70 herein said etiquette rules further comprise:
  The slots of an ASL must be contiguous and the same data channel must be used for the entire ASL.

74. The method of claim 70 wherein said schedule packets also identify ISRs and said etiquette rules further comprise:
  ASLs have precedence over ISRs, and between two ISRs that use the same channel and overlap in at least one time slot, the ISR with the smallest schedule priority ticket has precedence.

75. The method of claim 74 further comprising updating a feasible schedule of a node by applying said rule of claim 74 to any updated or new ISRs found in those of said packets reported by a neighbor of said node.

76. The method of claim 70 wherein said schedule packets also identify ISRs and said etiquette rules further comprise:
  During any given time slot assigned for data transmission, a node that is not transmitting or receiving on an established ASL must be listening in one of its advertised ISRs.

77. The method of claim 70 wherein said schedule packets also identify ISRs and said etiquette rules further comprise:
  When node i needs to establish a new ASL with a neighbor j, it must choose one of the advertised ISRs from j in a way that does not conflict with any other etiquette rules.

78. The method of claim 70 wherein said etiquette rules further comprise:
  A node can transmit only over established ASLs.

79. The method of claim 70 wherein said schedule packets also identify ISRs and said etiquette rules further comprise:
  Transmissions over an advertised ISR must be done using a listen-before-talk etiquette over the channel specified for the ISR.

80. The method of claim 70 further comprising, to update a node's working schedule, applying the following rules upon each new or updated ASL found in those of said packets reported by a neighbor of said node to determine if said each new or updated ASL is valid:
  2) said rule where an already established ASL has precedence over any requested ASL that conflicts with the already established ASL;
  3a) ASLs for broadcast transmission have precedence over ASLs for multicast or unicast transmission;
  3b) ASLs for multicast transmission have precedence over ASLs for unicast transmission;
  3c) Among the ASLs with the same precedence due to the type of transmission, the ASL with the smallest schedule priority ticket has precedence;
  4) No ASL to or from a given node may overlap on any time slot with another ASL to or from the same node;
  5) The slots of an ASL must be contiguous and the same data channel must be used for the entire ASL.

81. The method of claim 80 further comprising, for said each new or updated ASL, scanning conflict classes of each slot within a slot rage attributed to a new or updated ASL.

82. The method of claim 81 further comprising regarding as invalid any said new or updated ASL deemed to violate any of said rules in any of said new or updated ASL's slots.

83. The method of claim 80 further comprising, for a new or updated ASL, scanning a conflict class defined for a channel used in the system, where, said conflict class is associated with a slot and a channel and includes all valid and proposed ASLs that use said conflict class's channel and include said conflict class's slot.

84. The method of claim 83 further comprising picking said channel and regarding as invalid any said new or updated ASL deemed to violate any of said rules in any of said new or updated ASL's slots.

85. The method of claim 70 wherein said schedule packets also identify ISRs, said method further comprising requesting, by a node, a new ASL with a neighbor of said node by selecting an ISR maintained by said node for said neighbor, such that, said slot range is larger than or equal to the slot range needed for said new ASL.

86. The method of claim 85 further comprising:
  adding said requested ASL to said node's working schedule; and,
  requesting said ASL in a following schedule packet launched by said node.

87. The method of claim 70 wherein said schedule packets also identify ISRs and said rules of etiquette further comprise:
  3a) ASLs for broadcast transmission have precedence over ASLs for multicast or unicast transmission;
  3b) ASLs for multicast transmission have precedence over ASLs for unicast transmission;
  3c) Among the ASLs with the same precedence due to the type of transmission, the ASL with the smallest schedule priority ticket has precedence;
  4) No ASL to or from a given node may overlap on any time slot with another ASL to or from the same node;
  5) The slots of an ASL must be contiguous and the same data channel must be used for the entire ASL;
  6) ASLs have precedence over ISRs, and between two ISRs that use the same channel and overlap in at least one time slot, the ISR with the smallest schedule priority ticket has precedence;
  7) During any given time slot assigned for data transmission, a node that is not transmitting or receiving on an established ASL must be listening in one of its advertised ISRs;

8) When node i needs to establish a new ASL with a neighbor j, it must choose one of the advertised ISRs from j in a way that does not conflict with any other etiquette rules;
9) A node can transmit only over established ASLs;
10) Transmissions over an advertised ISR must be done using a listen-before-talk etiquette over the channel specified for the ISR.

88. The method of claim 87 further comprising, at a node, selecting which of said ISRs to report in a schedule packet to be launched by said node by:
monitoring utilization of available channels;
selecting those of said channels that are least utilized;
determining those of said ISRs that can exist over said least utilized channels according to said rules.

* * * * *